(12) United States Patent
Yeager et al.

(10) Patent No.: US 10,284,674 B2
(45) Date of Patent: May 7, 2019

(54) CACHE KEY BASED REQUEST ROUTING

(71) Applicant: Verizon Digital Media Services Inc., Dulles, VA (US)

(72) Inventors: Donnevan Scott Yeager, Anderson Island, WA (US); Derek Shiell, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 168 days.

(21) Appl. No.: 15/413,041

(22) Filed: Jan. 23, 2017

(65) Prior Publication Data

US 2018/0213053 A1 Jul. 26, 2018

(51) Int. Cl.
*G06F 13/00* (2006.01)
*H04L 29/08* (2006.01)

(52) U.S. Cl.
CPC ...... *H04L 67/2842* (2013.01); *H04L 67/1014* (2013.01)

(58) Field of Classification Search
CPC .............. H04L 67/2842; H04L 67/146; H04L 67/1008; H04L 67/42; H04L 67/02; H04L 67/1014
USPC ................. 709/201, 203, 217–219, 225, 229
See application file for complete search history.

(56) References Cited

U.S. PATENT DOCUMENTS

| | | | | |
|---|---|---|---|---|
| 6,990,580 B2 * | 1/2006 | Go | ........................... | H04L 63/04 380/277 |
| 7,117,362 B2 * | 10/2006 | Go | ........................... | H04L 63/04 713/168 |
| 7,124,297 B2 * | 10/2006 | Go | ........................... | H04L 63/04 713/168 |
| 7,215,779 B2 * | 5/2007 | Go | ........................... | H04L 9/083 380/277 |
| 9,413,842 B2 * | 8/2016 | Shiell | ................... | H04L 67/2852 |
| 9,635,121 B2 * | 4/2017 | Mathew | .............. | H04L 67/2842 |
| 2001/0037452 A1 * | 11/2001 | Go | ........................... | H04L 9/083 713/168 |
| 2005/0165771 A1 * | 7/2005 | Go | ........................... | H04L 63/04 |
| 2006/0015720 A1 * | 1/2006 | Go | ........................... | H04L 9/083 713/165 |
| 2014/0040415 A1 * | 2/2014 | Mathew | .............. | H04L 67/2842 709/213 |
| 2015/0088964 A1 * | 3/2015 | Shiell | ................... | H04L 67/2852 709/203 |

(Continued)

*Primary Examiner* — Kenneth R Coulter
(74) *Attorney, Agent, or Firm* — Ansari Katiraei LLP; Arman Katiraei; Sadiq Ansari (57) ABSTRACT

Disclosed are systems and methods for performing consistent request distribution across a set of servers based on a request Uniform Resource Locator (URL) and one or more cache keys, wherein some but not all cache keys modify the content requested by the URL. The cache keys include query string parameters and header parameters. A request director parses a received request, excludes irrelevant cache keys, reorders relevant cache keys, and distributes the request to a server from the set of servers tasked with serving content differentiated from the request URL by the relevant cache keys. The exclusion and reordering preserves the consistent distribution of requests directed to the same URL but different content as a result of different cache key irrespective of the placement of the relevant cache keys and inclusion of irrelevant cache keys in the request.

20 Claims, 7 Drawing Sheets

(56) References Cited

U.S. PATENT DOCUMENTS

2016/0241670 A1* 8/2016 Shiell .................. H04L 67/2852
2017/0302755 A1* 10/2017 Mathew .............. H04L 67/2842

* cited by examiner

CACHE KEY BASED REQUEST ROUTING

BACKGROUND ART

A content delivery network (CDN) is a distributed platform that delivers the content and services of different providers on behalf of those providers. The CDN distributed platform retrieves the content and services from the providers' servers and fans out the retrieved content and services to different clients or users across a digital network, such as the Internet, while also caching the content and services. The caching allows the distributed platform to serve the content and services in response to subsequent client requests without the need or delay associated with re-retrieving the content and services from the providers' servers.

The CDN distributed platform is formed by one or more points-of-presence (PoP). The PoPs are located in different geographic regions. Each PoP is tasked with delivering the content and services to the one or more regions that receive optimal content delivery performance from the PoP. The optimal performance can be based on geographic or network node proximity to the one or more regions or other factors that affect the content delivery performance to those one or more regions. Each PoP includes one or more request directors and two or more back-end servers.

The request directors include load balancing devices or other devices that distribute requests amongst the back-end servers. The request directors receive requests issued by different clients over a digital network. The requests can be embodied as HyperText Transfer Protocol (HTTP) GET requests as one example. The issued requests are distributed across the back-end servers and the back-end servers respond to the requests by serving the requested content or services.

To maximize performance and efficiency, the request directors attempt to provide a consistent distribution of requests, whereby requests for the same content or service are distributed to the same server. Such consistent request distribution optimizes performance and efficiency of the back-end servers by allowing different back-end servers to specialize in serving a subset of the content or services served by the PoP rather than generally serving all such content or services at different times. More specifically, the consistent request distribution increases the cache hit ratios of the servers and reduces cache rewriting, thereby allowing the servers to respond to a greater number of requests directly from cache without having to retrieve the requested content or service from an origin site of the originating content or service provider.

The consistent request distribution is based on the Uniform Resource Locator (URL) or Uniform Resource Identifier (URI) specified in the requests. For instance, the request directors may hash the request URL in order to identify which of the back-end servers is tasked with serving the requested content or service identified by the URL. The Cache Array Routing Protocol (CARP) is one URL hash based request distribution scheme. The terms URL and URI are used interchangeably hereafter.

The request URL does not, however, consistently and accurately identify the content or service being requested in all instances. Different dynamic content, unique customized content, or other content and services can be requested using the same request URL. In such cases, the requested content or service is differentiated by other cache keys besides the request URL. The cache keys include one or more query string parameters appended to or otherwise included with the URL or header parameters that differentiate the content or service being requested.

Prior art request directors typically ignore the cache keys when performing the request routing decision and base the routing decision solely on the base URL. This is because not all cache keys are relevant to the routing decision, the ordering or placement of relevant cache keys can differ from request to request, and the number of cache keys for the same requested content or service can differ from request to request.

Ignoring cache keys in the routing decision is a simplistic means with which to preserve request distribution consistency. This consistency comes at the expense of reduced cache hit ratios and increased load on the server that receives the requests directed to the same URL but different content or services.

Hot file mechanisms within the PoP can dynamically allocate additional server resources to prevent the server designated to respond to requests directed to the same URL but different content from becoming overwhelmed and underperforming. However, the efficiency and performance of the additional server resources is also compromised as they too will experience reduced cache hit ratios because the request directors incorrectly triggered the hot file mechanisms thinking that the requests are directed to the same content because of the common URL even though the requests are actually directed to different content because of the included but ignored cache keys.

Accordingly, there is a need for a consistent request distribution scheme that consistently and accurately routes a request based on the request URL and one or more cache keys included with the request, wherein the cache keys include some but not necessarily all query string parameters or header parameters associated with the request. To this end, there is a need to track, differentiate, and base the request distribution on relevant cache keys that affect the routing decision while ignoring other irrelevant cache keys that do not affect the routing decision. There is further a need to maintain request distribution consistency when the requests provide a different ordering or positioning for the relevant cache keys or a different number of cache keys as part of the request.

BRIEF DESCRIPTION OF THE DRAWINGS

A preferred embodiment for cache key based request routing will now be described, by way of example only, with reference to the accompanying drawings in which.

DETAILED DESCRIPTION

Provided are systems and methods for advanced load balancing. The advanced load balancing involves a request director performing consistent request distribution across a set of back-end servers by basing the request routing decision on a request Uniform Resource Locator (URL) or Uniform Resource Identifier (URI) and one or more cache keys, wherein the one or more cache keys affect what content or service is returned in reply to the request. Hereafter, the term URL interchangeably refers to a URL or URI.

Cache keys affecting the routing decision and content or service selection in conjunction with the request URL include some but not all query string parameters of a client issued content request. Accordingly, some embodiments perform request distribution based on the request URL and relevant query string parameters included with the URL that affect or modify the content or service returned in response to the request while ignoring other query string parameters that do not affect or modify the content or service returned in response to the request.

Other cache keys that can affect the routing decision and content or service selection in conjunction with the request URL include one or more parameters specified as part of the request header. Accordingly, some embodiments perform request distribution based on the request URL and one or more request header parameters that affect or modify the content or service returned in response to the request while ignoring other header parameters that do not affect or modify the content or service returned in response to the request.

The request director, with optional assistance from the set of back-end servers, tracks the relevant cache keys that affect the routing decision and content or service selection on an individual domain name, URL, content, or service basis. The request director identifies the relevant cache keys upon receiving a content or service request, excludes the irrelevant cache keys, reorders the identified relevant cache keys, and then hashes the request URL with the identified relevant cache keys in the rearranged ordering to provide a consistent distribution across the set of back-end servers for requests directed to the same URL but different content or services as a result of the relevant cache keys.

The request director is any load balancing device or front-end server that initially receives requests directed to content or services delivered by the set of back-end servers. The requests are originated from different client devices spread out across a digital network, such as the Internet. The requests can be embodied as HyperText Transfer Protocol (HTTP) GET requests or other messaging formats. The request director manages the distribution of those requests across the set of back-end servers with the objective of achieving a high degree of accuracy with respect to distributing requests for the same content or service to the same back-end server regardless of whether the same request URL identifies different content or services. As noted above, the request director differentiates requests directed to the same URL but different content or services on the basis of relevant cache keys included with those requests. For simplicity, the term content references both content and services.

The set of back-end servers receive the requests from the request director and return the requested content or service to the requesting client over the digital network. Content refers to digital media or files (e.g., images, text, videos, script, audio, web pages, applications, games, documents, etc.). A service refers to a process, task, or work that is performed over the digital network. The set of back-end servers may obtain copies of the requested content or service from cache or from an appropriate origin server when not in cache.

The request director can operate with the set of back-end servers in a point-of-presence (PoP). The PoP represents any physical or logical grouping of the request director with the set of back-end servers.

Figure 1:
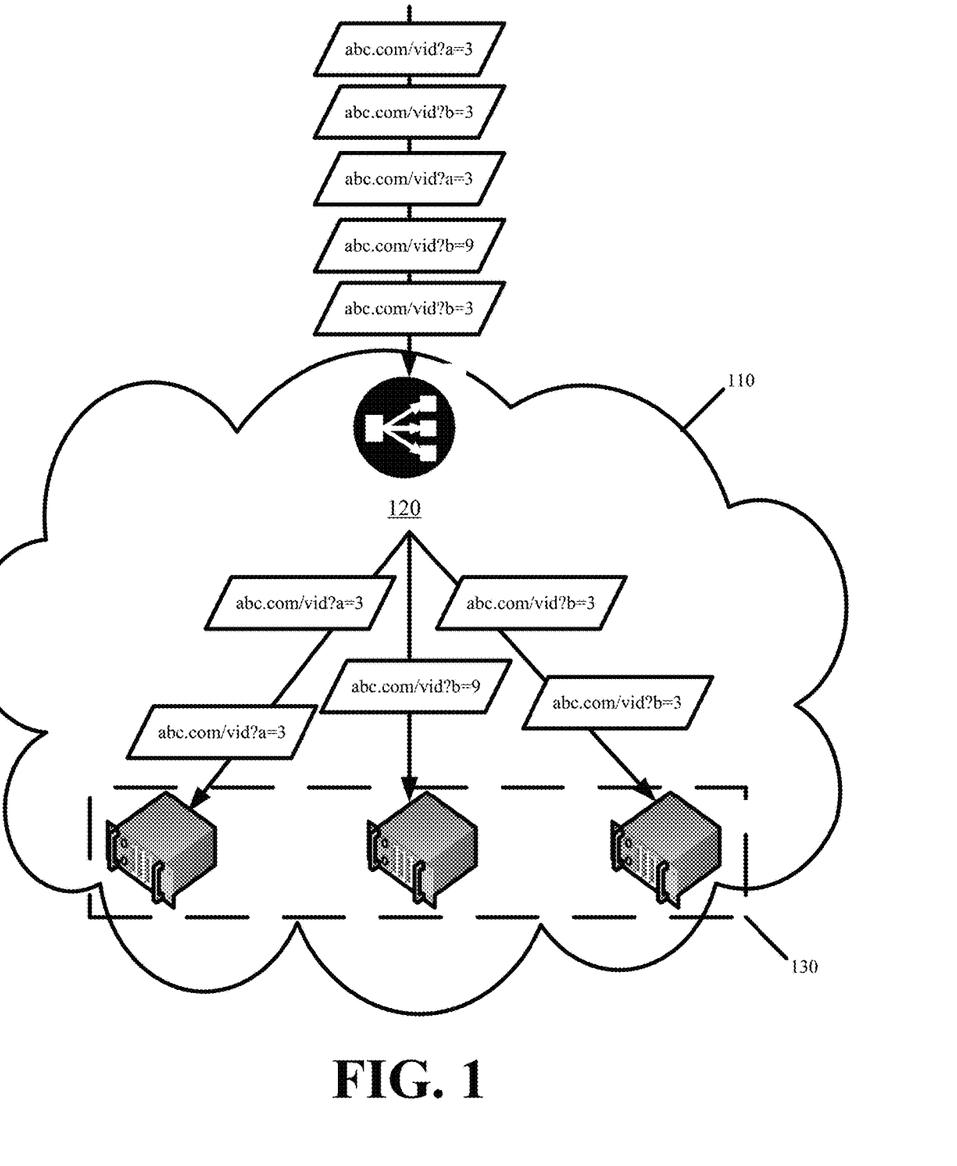
FIG. 1 illustrates a PoP performing advanced load balancing and request distribution by accounting for cache keys in addition to the request URL in accordance with some embodiments.

FIG. 1 illustrates a PoP 110 performing advanced load balancing and request distribution by accounting for cache keys in addition to the request URL in accordance with some embodiments. The PoP 110 includes a request director 120 and a set of back-end servers 130. As shown, the request director 120 provides a consistent distribution for requests directed to the same URL but different content or services across the set of back-end servers 130 based on one or more of the cache keys included as part of the requests.

The PoP 110 of FIG. 1 may be one of many that collectively form a distributed platform, such as a content delivery network (CDN). Each PoP 110 may have more than one request director that cooperate to provide the consistent request distribution by way of the advanced load balancing described herein. In other words, the systems and methods for advanced load balancing can be adapted for execution by two or more request directors with the task of distributing requests across the same set of back-end servers.

Figure 2:
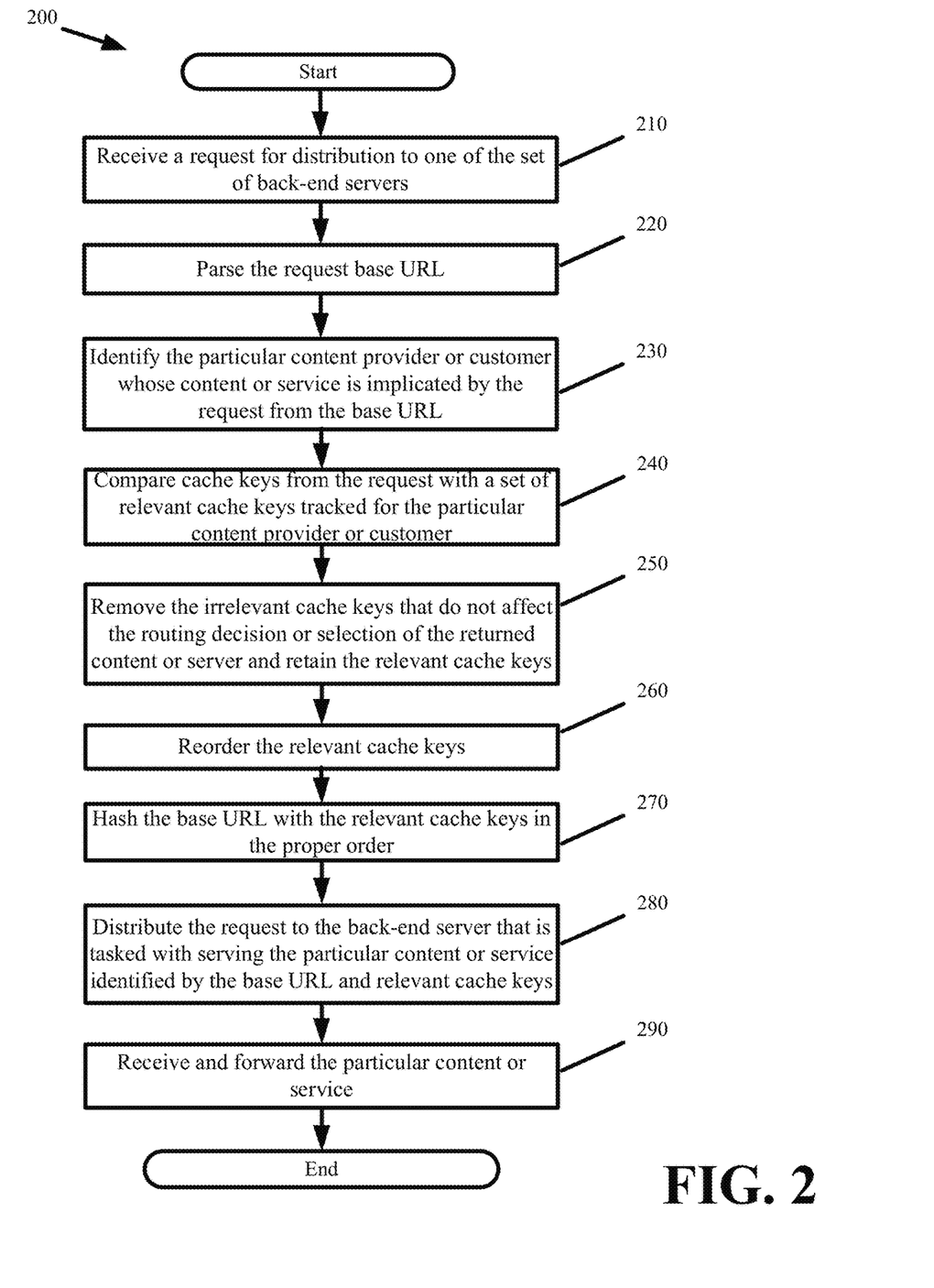
FIG. 2 presents a process for performing advanced load balancing by accounting for cache keys in accordance with some embodiments.

FIG. 2 presents a process 200 for performing advanced load balancing by accounting for cache keys in accordance with some embodiments. The process 200 is performed by a request director that distributes requests across a set of back-end servers.

The process 200 commences with the request director receiving (at 210) a request for distribution to one server of the set of back-end servers. The process parses (at 220) the request base URL.

From the parsing, the request director extracts the base URL and any cache keys accompanying the request. The process identifies (at 230) the particular content provider or customer whose content or service is implicated by the request from the base URL.

The process compares (at 240) the extracted cache keys with a set of relevant cache keys tracked for the particular content provider or customer, wherein the set of relevant cache keys are cache keys that have been previously identified to affect the routing decision and the selection of the content or service returned in response to the base URL. In other words, the set of relevant cache keys are query string parameters or header parameters that the particular content provider or customer uses to differentiate the content or service identified by a common URL.

The process removes (at 250) the irrelevant cache keys that do not affect the routing decision or selection of the returned content or service and retains the relevant cache keys. The removal step allows the request to be issued with any number of arbitrary cache keys without changing the final routing decision made by the director. The process further reorders (at 260) the relevant cache keys. In some embodiments, the ordering involves a case insensitive alphanumeric ordering of the relevant cache keys. It should be apparent that different orderings can be performed in different embodiments. The reordering allows for the cache keys to have any arbitrary positioning and placement amongst other relevant cache keys or irrelevant cache keys without affecting the routing decision.

The process hashes (at 270) the base URL with the relevant cache keys in the proper order. The process selects and distributes (at 280) the request to a back-end server from the set of back-end servers based the hash result, wherein the selected back-end server is tasked with serving the particular content or service identified by the base URL and relevant cache keys.

The process may optionally receive (at 290) the particular content or service from the selected back-end server and forward the particular content or service to the requesting client. The request director can also inspect the header of the particular content or service for confirmation of the relevant cache keys affecting the particular content or service selection. The request director can use the confirmation to update its tracking of relevant cache keys for that content provider or customer. This manner of relevant cache key tracking is further described below.

In some embodiments, the request director tracks the relevant cache keys that affect the routing decision and content or service selection based on configurations provided by the content or service providers that rely on the set of back-end servers for delivery of their content or services. The configurations list the cache keys that are relevant for each domain name, URL, content, or service. In some such embodiments, when the request director receives a particular request, the request director obtains the configuration listing the relevant cache keys for the particular request or the content provider whose content is implicated by the particular request. The request director then uses the configuration to identify, extract, and include the relevant cache keys in the hashing determination for selecting the particular back-end server from the set of back-end servers that is tasked with delivery of the requested content or service that is differentiated by the URL and relevant cache key combination.

Some embodiments provide a machine learning implementation for tracking and differentiating the relevant cache keys affecting the routing decision and content or service selection from the irrelevant cache keys that do not affect the routing decision or content or service selection. The machine learning implementation differentiates the relevant cache keys without human assistance and without the configurations or as a supplement to the configurations defined by the providers. In some embodiments, the machine learning implementation is based on the return of the requested content or service through the request director as described with reference to step 290 of FIG. 2. Specifically, the back-end servers provide the request director with the relevant cache keys that affected the content or service response for a particular request after receiving the particular request from the request director and retrieving the content or service requested by the combination of the base URL and one or more relevant cache keys included as part of the particular request. The back-end server may include the relevant cache keys in the header of the packets forwarded through the request director to the requesting client. The request director adds or modifies its internal tracking of the relevant cache keys with those found in the header of the packets sent from the back-end server.

In some embodiments, the request director tracks the relevant cache keys affecting the routing decision with a hash dictionary. The request director hashes the relevant cache keys that affect the routing decision and content or service selection. The hashing results produce different hash keys that point or map to different entries in the hash dictionary. The request director enters the relevant cache keys in the hash dictionary based on the hash keys.

The request director also uses the same hash keys to identify cache key relevance. For example, the request director hashes a particular cache key and if the resulting hash key points or maps to a populated entry in the hash dictionary, the request director determines that the particular cache key is a tracked relevant cache key that affects or modifies the routing decision and content or service selection.

In some other embodiments, the request director tracks the relevant cache keys affecting the routing decision with a bloom filter. The bloom filter is an array of indices. The size of the bloom filter and the total number of indices in the array is defined to prevent false positives. The size definition is based on the total expected number of relevant cache keys. The bloom filter can also be periodically reset or flushed to prevent false positives.

As before, the request director hashes the relevant cache keys that affect the routing decision and content or service selection. However, in the bloom filter embodiments, the hashing results produce unique sets of indices from the bloom filter. The request director enters the sets of indices representing the relevant cache keys in the bloom filter in order to track them in a condensed fashion. The unique set of indices for different relevant cache keys may have one or more overlapping array indices, but the entire set of indices for different relevant cache keys will not overlap. The request director also uses the set of indices to identify cache key relevance. For example, the request director hashes a particular cache key and if all indices resulting from the hashing are already set in the bloom filter, the request director determines that the particular cache key is a tracked relevant cache key that affects or modifies the routing decision and content or service selection.

The same cache key may have different relevance for different domain names, providers, content, or services. For example, the cache key "?parameter=value" can affect or modify the routing decision and content selection for content associated with a first domain name but not affect or modify the routing decision and content selection for content associated with a different second domain name. Accordingly, the request director may hash the cache key with part or all of the request base URL in order to produce the hash key that represents the cache key in the hash dictionary or the set of indices representing the cache key in the bloom filter. For instance, the request director may combine the host or domain name from the base URL with the cache key or combine the entire base URL with the cache key to produce the hash key accessing the hash dictionary.

Figure 3:
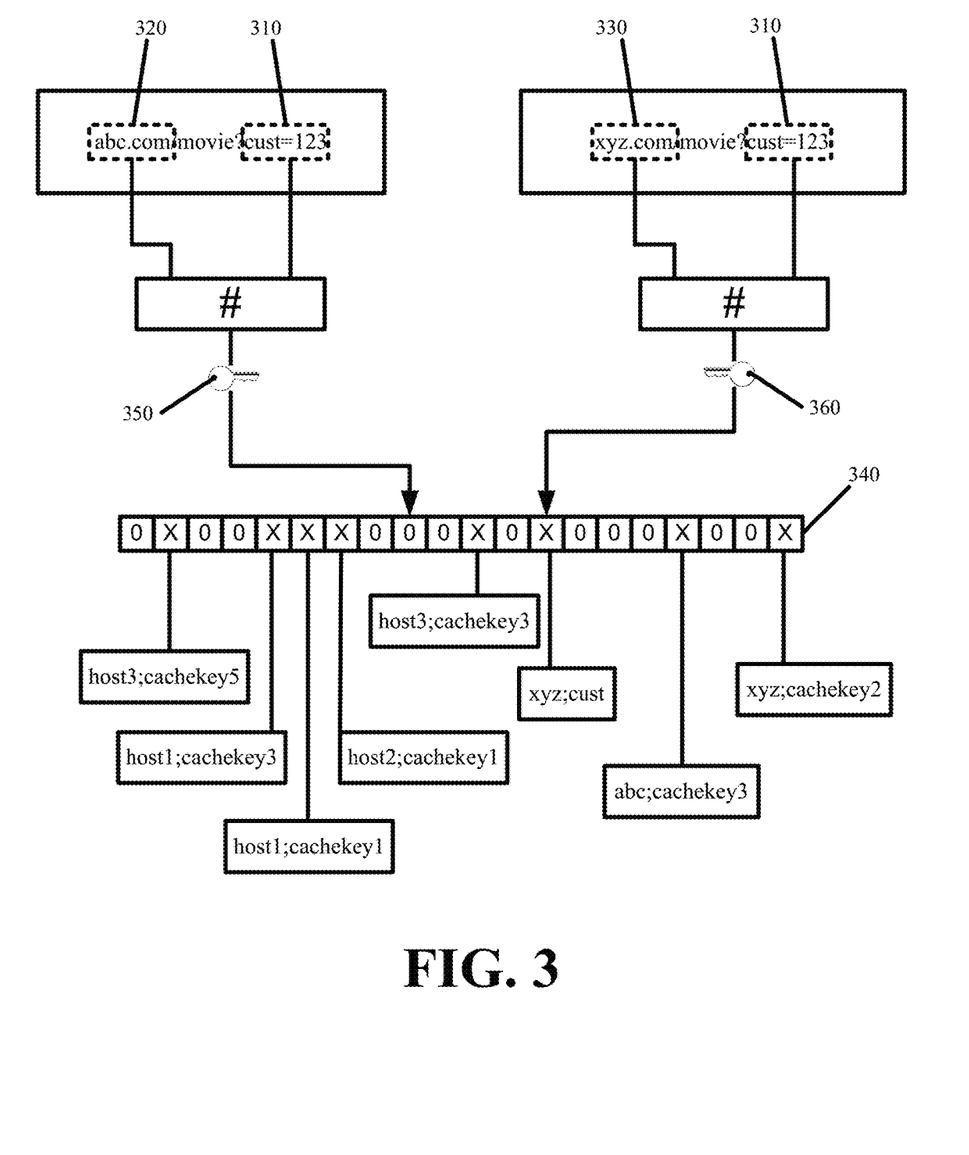
FIG. 3 conceptually illustrates hashing the same cache key with different URLs (i.e., hosts) of different requests with the resulting hash keys pointing to different entries in the hash dictionary.

FIG. 3 conceptually illustrates hashing the same cache key 310 with different URLs (i.e., hosts 320 and 330) of different requests with the resulting hash keys pointing to different entries in the hash dictionary 340. The first hash key 350 resulting from hashing the first host 320 and the cache key 310 from the first request points to an empty entry in the hash dictionary 340, indicating that the cache key 310 is not a relevant cache key that affects the routing decision for requests directed to host 320. The second hash key 360 resulting from hashing the second host 330 and the cache key 310 from the second request points to a populated entry in the hash dictionary 340, indicating that the cache key 310 is a relevant cache key that does affect the routing decision for requests directed to host 330.

The hash dictionary and bloom filter described above provide inclusive tracking of the relevant cache keys. More specifically, the hash dictionary tracks the cache keys that are relevant to and affect the routing decision. The hash dictionary can alternatively be used for exclusive tracking of relevant cache keys. The exclusive tracking involves using the hash dictionary to track the irrelevant cache keys instead of the relevant cache keys. Accordingly, if the request director hashes a query string parameter and the resulting hash key points to a set entry in the hash dictionary, the request director identifies that query string parameter as an irrelevant parameter that should not be accounted for in the request distribution determination.

Figure 4:
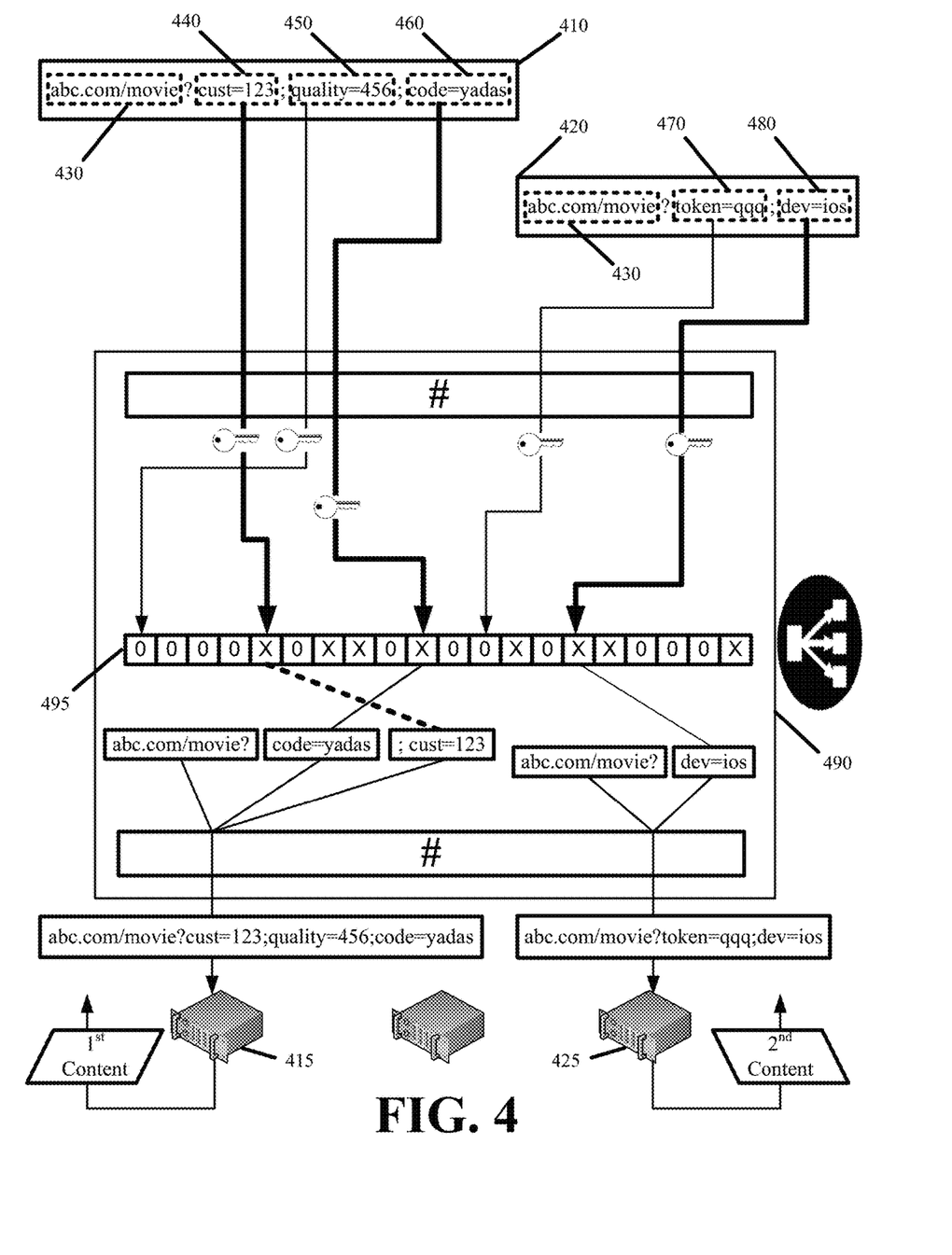
FIG. 4 conceptually illustrates performing a request distribution based on a request URL and a set of cache keys in accordance with some embodiments.

FIG. 4 conceptually illustrates performing a request distribution based on a request URL and a set of cache keys in accordance with some embodiments. The figure illustrates first and second requests 410 and 420 specifying the same base URL 430 but with different sets of cache keys directing the first and second requests 410 and 420 to different content or services. The first request 410 includes three different cache keys 440, 450, and 460 and the second request 420 includes two different cache keys 470 and 480. The cache keys 440-480 are different query string parameters that are appended to the base URL 430.

The request director 490 parses and extracts each cache key from each request 410 and 420. The request director 490 performs a first hash of each extracted cache key to produce a unique hash key in the hash dictionary 495 maintained by the request director 490. As noted above, the first hash of each cache key can be performed with the host, domain name, or base URL 430 so as to restrict the finding of the relevant cache keys to those used by the implicated content provider. The request director 490 determine cache key relevancy based on whether the hash dictionary 495 entries identified by the resulting hash keys are set.

The hash keys produced from the first hash of the first cache key 440 of the first request 410 and the third cache key 460 of the first request 410 are set in the hash dictionary 495. However, the hash key produced from the first hash of the second cache key 450 of the first request 410 is not set in the hash dictionary 495. This indicates that the first and third cache keys 440 and 460 of the first request 410 are relevant to the routing decision and do modify the content or service that is served in response to the first request 410, while the second cache key 450 of the first request 410 is irrelevant to the routing decision and does not modify the returned content or service.

In similar fashion, the request director 490 determines that the hash key produced from the first hash of the second cache key 480 of the second request 420 is set in the hash dictionary 495, but hash key produced from the first hash of the first cache key 470 of the second request 420 is not set in the hash dictionary 495. This indicates that the second cache key 480 of the second request 420 is relevant to the routing decision and does modify the content or service that is served in response to the second request 420 and further indicates that the first cache key 470 of the second request 420 is irrelevant to the routing decision and does not modify the returned content or service.

The request director 490 orders the relevant cache keys 440 and 460 of the first request 410 since the first request 410 includes multiple relevant cache keys 440 and 460. In this figure, the ordering moves the third cache key 460 ahead of the first cache key 440 because of the alphanumeric sequence of the cache keys 440 and 460.

The request director 490 performs a different second hash of the base URL 430, the relevant third cache key 460, and the relevant third cache key 440 of the first request 410 in order to select which back-end server of the set of back-end servers is tasked with delivering the first content requested by the first request 410. In some embodiments, the first hash is performed with a first hashing function and the second hash is performed with a different second hashing function. In some embodiments, the request director 490 performs the second hash of the base URL 430 to produce a first result. The request director 490 performs the second hash of the first result with the third cache key 460 of the first request 410 to produce a second result. The request director 490 performs the second hash of the second result with the first cache key 440 of the first request 410 to produce a third result. Based on the third result, the request director 490 selects a first back-end server 415 from the set of back-end servers to receive and response to the first request 410.

The request director 490 performs a similar second hash of the base URL 430 and the relevant second cache key 480 of the second request 420 to select a different second back-end server 425 from the set of back-end servers to receive and respond to the second request 420. Even though the first and second requests 410 and 420 include the same base URL 430, the requests 410 and 420 are directed to different content as identified by the different relevant cache keys (e.g., 440, 460, and 480) included with each request. In other words, the request director 490 determines that the first content identified from the reordered hashing of the first and third cache keys 440 and 460 of the first request 410 along with the base URL 430 is served by the first back-end server 415, whereas the second content identified from the hashing of the second cache key 480 of the second request 420 along with the base URL 430 is served by the different second back-end server 425.

The first back-end server 415 serves the first content in response to receiving the first request 410 from the request director 490. The second back-end server 425 serves the second content in response to receiving the second request 420 from the request director 490. As noted above, the servers 415 and 425 may pass the content through the request director 490. The servers 415 and 425 may identify the relevant cache keys of the first and second requests 410 and 420 in the header of the content passing through the request director 490. The request director 490 updates the hash dictionary 495, if necessary, based on the content headers and forwards the content to the requesting client(s).

FIG. 4 illustrates one manner of hashing the base URL and cache keys to select between the back-end servers. In some other embodiments, the request director combines the base URL, the third cache key, and the first cache key of the first request in order and performs a single hash of the combination. The request director then uses the single resulting value in selecting one of the set of back-end servers to receive the first request.

In still some other embodiments, the request director hashes the base URL, the third cache key, and the first cache key of the first request in parallel before combining the results in the specific ordering. The combined result is then used in selecting one of the set of back-end servers to receive the first request.

When two or more request directors operate within the same PoP or operate to distribute requests across the same set of back-end servers, the request directors can use a single shared hash dictionary or bloom filter to track the relevant cache keys. Alternatively, each request director can maintain its own hash dictionary or bloom filter separately and update the hash dictionary or bloom filter based on server provided responses to requests that were previously routed to the back-end servers by that request director.

Figure 5:
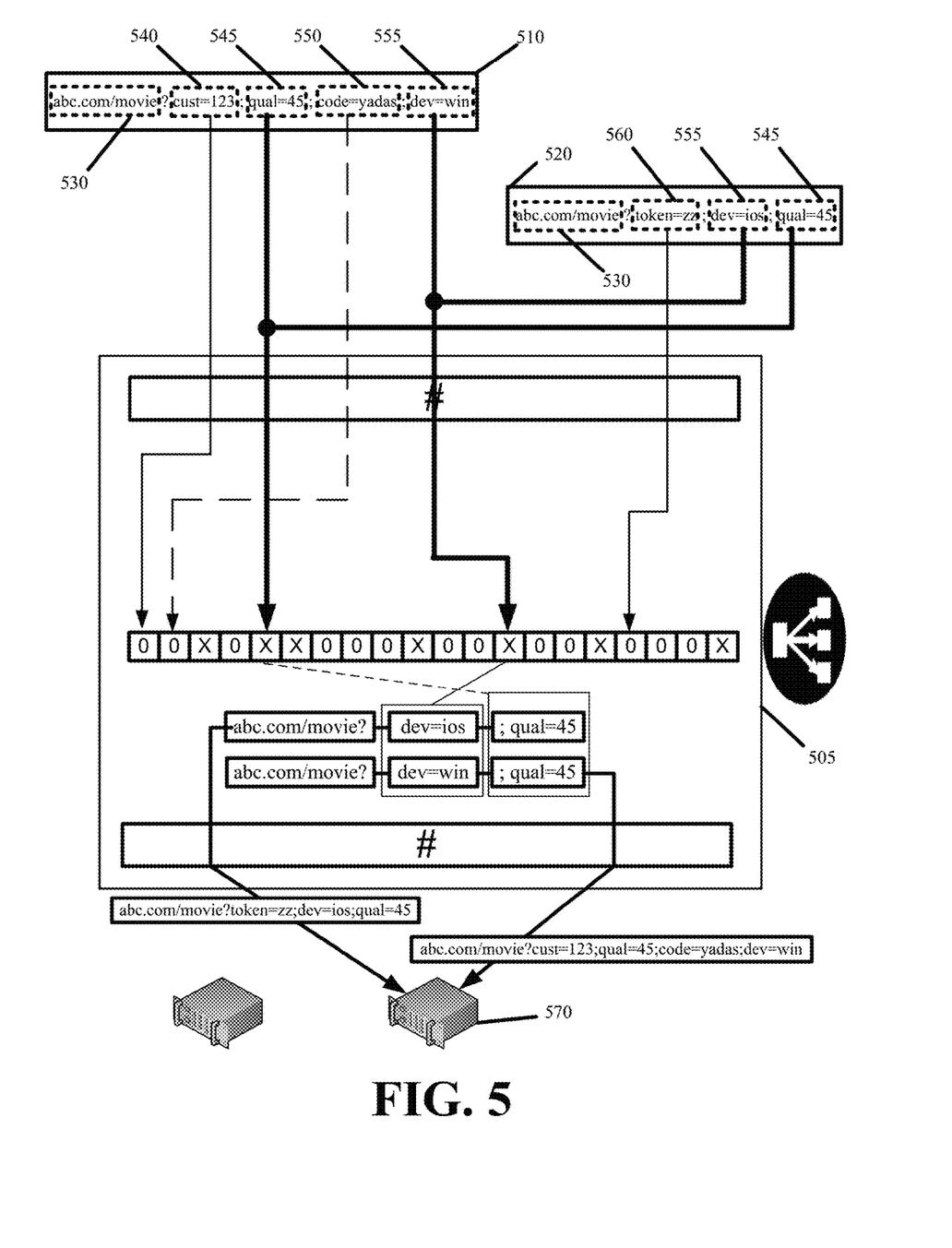
FIG. 5 illustrates the request director of some embodiments achieving a consistent request distribution for first and second requests specifying the same base URL and different cache keys, but that nevertheless direct the requests to the same content.

FIG. 5 illustrates the request director 505 of some embodiments achieving a consistent request distribution for first and second requests 510 and 520 specifying the same base URL 530 and different cache keys, but that nevertheless direct the requests 510 and 520 to the same content. In this figure, the first request 510 includes a base URL 530 with four cache keys and the second request 520 includes the base URL 530 with three cache keys. More specifically, the first request 510 is defined with a first cache key 540 in a first location, a second cache key 545 in a second location, a third cache key 550 in a third location, and a fourth cache key 555 in a fourth location. The second request 520 is defined with a fifth cache key 560 in the first location, the same fourth cache key 555 as found in the fourth location of the first request 510 in the second location of the second request 520, and the same second cache key 545 as found in the second location of the first request 510 in the third location of the second request 520. In some embodiments, the similarity in the second and fourth cache keys 545 and 555 found in both requests refers to the query string parameters without consideration of the values for the parameters. In other words, the values for the parameters can be different without affecting the routing decision. In some other embodiments, the similarity in the second and fourth cache keys 545 and 555 refers to the query string parameter and value combination being identical.

The request director 505 determines that the second and fourth cache keys 545 and 555 from each of the first and second requests 510 and 520 are relevant in the routing decision and do modify the content or service selection, and that the first, third, and fifth cache keys 540, 550, and 560 are irrelevant in the routing decision and do not modify the content or service selection. Here again, the determination of the relevant cache keys 545 and 555 is based on individually hashing each cache key and determining if the resulting hash keys are set within the hash dictionary used to track relevant cache keys. The request director 505 then removes the irrelevant cache keys 540, 550, and 560 from the first and second requests 510 and 520 and reorders the relevant cache keys 545 and 555.

The removal and reordering causes the first and second requests 510 and 520 to mirror each other such that when the request director 505 hashes the pruned and reordered requests, both the first and second requests produce the same hash result. Consequently, the request director 505 distributes the first and second requests 510 and 520 to the same back-end server 570.

By incorporating the cache keys in the routing decision, the request director improves routing accuracy and also improves "hotfile" scaling. A hotfile is a content or service that receives excess demand over a given interval, wherein the excess demand may overwhelm the original back-end server tasked with the distribution of the hotfile content or service. In other words, performance of the original back-end server could degrade if it was to receive and respond to all such requests as they arrive. In such cases, the request director recognizes particular content that exceeds a hotness threshold and begins to distribute the requests for the particular content to additional back-end servers. In doing so, the request director automatically scales the back-end server resources allocated to serve the particular content so that two or more back-end servers are tasked with responding to the requests for the hotfile content or service.

Without accounting for cache keys in addition to the base URL when making the routing decision, the request director may receive a plurality of requests directed to the same base URL and wrongly determine that all such requests are directed to the same content. As described above, cache keys accompanying the requests provide the differentiator that directs the requests to different content.

Figure 6:
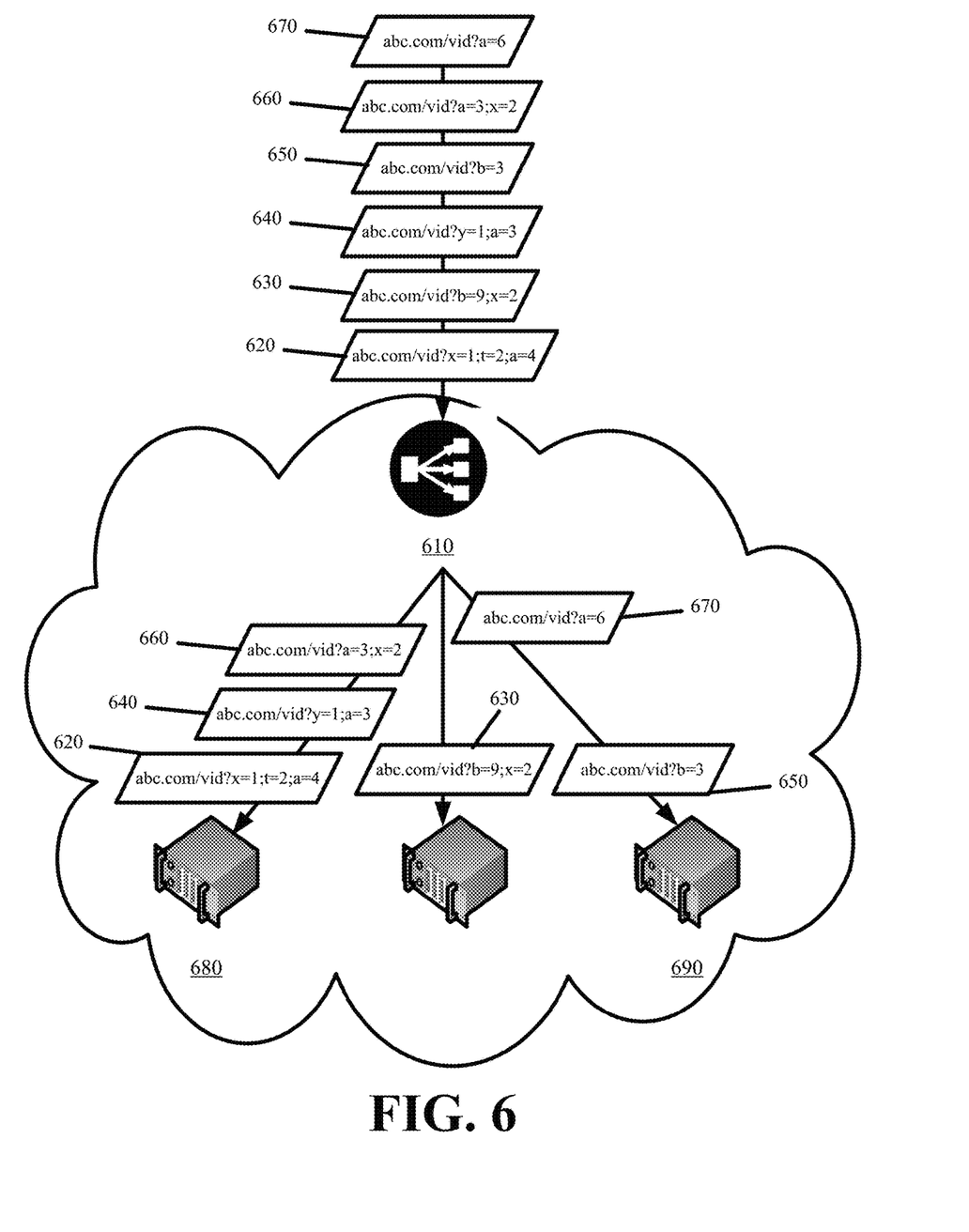
FIG. 6 illustrates accurate hotfile scaling for requests directed to the same base URL but different content in accordance with some embodiments.

FIG. 6 illustrates accurate hotfile scaling for requests directed to the same base URL but different content in accordance with some embodiments. As shown, the request director 610 receives six requests 620, 630, 640, 650, 660, and 670 directed to the same base URL. In performing the advanced load balancing and request distribution to account for the cache keys included with the requests 620-670, the request director 610 identifies that four of the six requests 620, 640, 660, and 670 are directed to the same content and that the other two requests 630 and 650 are directed to different content.

The request director 610 routes the first three of the four requests 620, 640, and 660 directed to the same content to the first back-end server 680. However, the fourth request 670 for that same content triggers hotfile scaling. Accordingly, the request director 610 routes the fourth request 670 to the second back-end server 690 so that the first back-end server 680 is not overrun.

The advanced load balancing therefore affects request count tracking by the request director or at the PoP. The request director increments request counts for particular content using the base URL and relevant cache keys accompanying the request. This allows the request director to more granularly and accurately track request counts for dynamic content, custom content, or other content whose selection is affected by the presence of one or more cache keys.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
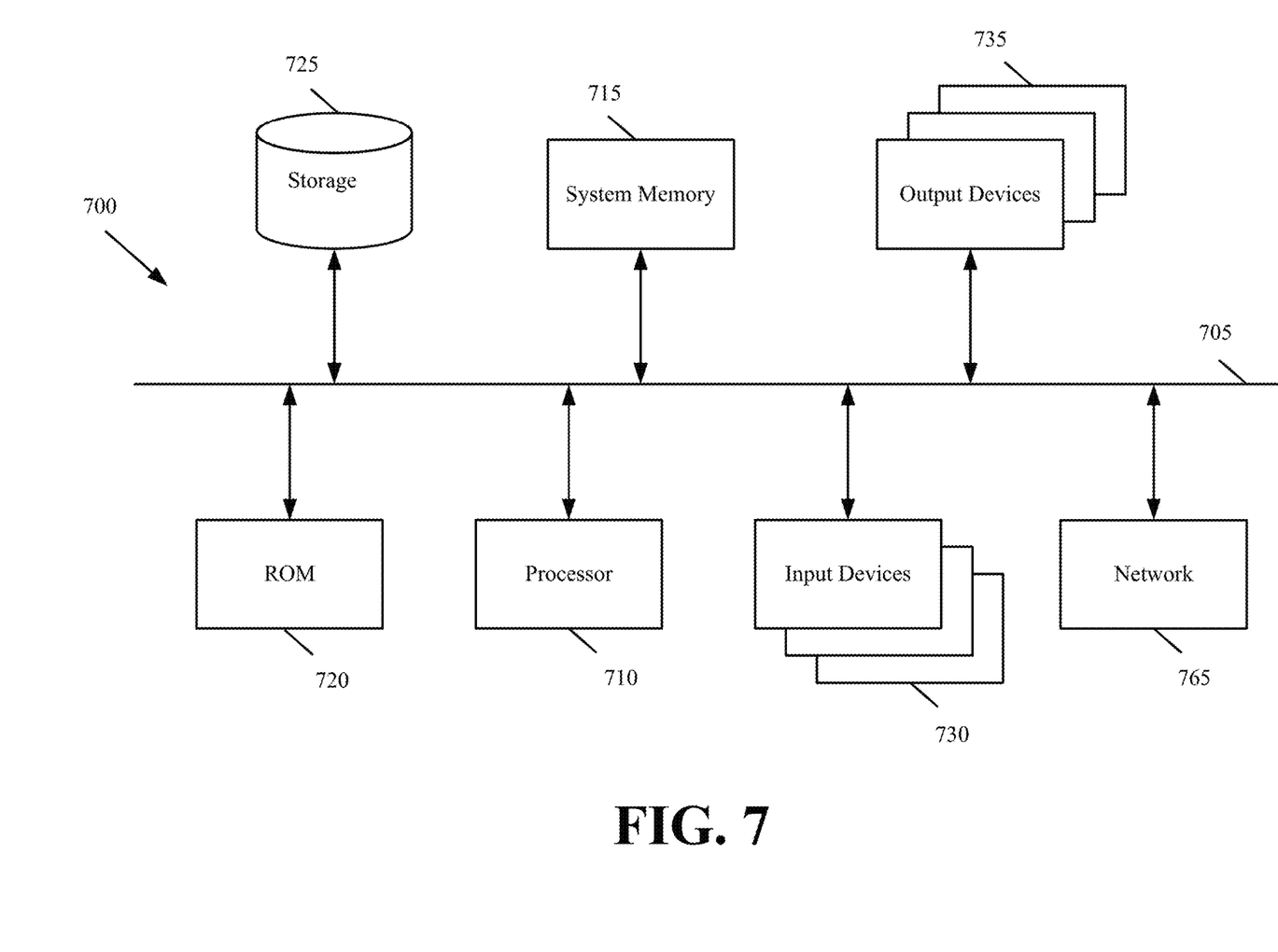
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., request director, caching server, etc.). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device. Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving over a digital network, a plurality of content requests for distribution across a set of servers, wherein the plurality of content requests comprise a common Uniform Resource Locator (URL) and different cache keys, wherein the different cache keys direct the common URL of the plurality of content requests to a plurality of content, and wherein each server of the set of servers is tasked with delivering different content of the plurality of content;
extracting said common URL and at least one cache key from a particular content request of the plurality of content requests, wherein said common URL and the at least one cache key direct the particular content request to particular content from the plurality of content;
producing a result from hashing the at least one cache key;
selecting based on said result, a particular server from the set of servers tasked with serving said particular content identified from the common URL and the at least one cache key; and
distributing the particular content request to the particular server.

2. The method of claim 1, wherein the particular content request comprises a first cache key and a different second cache key, the method further comprising (i) excluding the first cache key from said producing based on absence of the first cache key in a tracked list of relevant cache keys and (ii) retaining the second cache key as the at least one cache key for said producing based on presence of the second cache key in the tracked list of relevant cache keys, wherein the tracked list of relevant cache keys comprises a plurality of cache keys modifying content requested with said common URL.

3. The method of claim 2 further comprising hashing the first cache key and the second cache key, wherein said hashing produces first and second results with the first result from hashing the first cache key mapping to an empty entry in the tracked list of relevant cache keys and with the second result from hashing the second cache key mapping to a populated entry in the tracked list of relevant cache keys.

4. The method of claim 3, wherein the tracked list of relevant cache keys is a bloom filter with an array of indices, the first result maps to a first set of indices in the array of indices with at least one index that is not set, and the second result maps to a different second set of indices in the array of indices that are all set.

5. The method of claim 2, wherein said distributing comprises forwarding the particular content request with the common URL, the first cache key, and the second cache key to the particular server.

6. The method of claim 2 further comprising retrieving the tracked list of relevant cache keys based on said common URL, wherein the tracked list of relevant cache keys comprises cache keys used by a content provider of the particular content in differentiating content requested using the common URL.

7. The method of claim 1, wherein the at least one cache key comprises a query string parameter appended to the common URL or a header parameter included with the particular content request.

8. The method of claim 1, wherein the particular content request comprises a first cache key before a different second cache key, the method further comprising reordering the second cache key before the first cache key, and wherein said producing comprises hashing the second cache key and the first cache key according to said reordering.

9. The method of claim 8, wherein the particular content request further comprises a third cache key, the method further comprising (i) identifying the first cache key and the second cache key as relevant cache keys modifying content requested by the common URL, and the third cache key as irrelevant and not modifying the content requested by the common URL, and (ii) excluding the third cache key from said reordering and said producing.

10. A method comprising:
receiving a plurality of requests for distribution across a set of servers, wherein the plurality of requests comprise a common Uniform Resource Locator (URL) and different cache keys, wherein the different cache keys direct the common URL of the plurality of requests to a plurality of content, and wherein each server of the set of servers is tasked with delivering different content of the plurality of content;

selecting a first server from the set of servers tasked with serving first content of the plurality of content based on the common URL and a first cache key from a first request of the plurality of requests;

selecting a different second server from the set of servers tasked with serving different second content of the plurality of content based on the common URL and a different second cache key from a second request of the plurality of requests, wherein the first cache key modifies the first request by directing the common URL to said first content and the second cache key modifies the second request by directing the common URL to said second content; and distributing the first request to the first server and the second request to the second server based on said selecting.

11. The method of claim 10, wherein said selecting the first server comprises producing a first result from hashing the first cache key of the first request, and wherein said selecting the second server comprises producing a second result from hashing the second cache key of the second request.

12. The method of claim 11, wherein said selecting the first server further comprises identifying the first server for the first request based on the first result, and wherein said selecting the second server further comprises identifying the second server for the second request based on the second result.

13. The method of claim 10, wherein the plurality of requests comprises a third request with the common URL, the first cache key, and a different third cache key, the method further comprising selecting a different third server from the set of servers tasked with serving third content of the plurality of content differing from said first content based on the common URL, the first cache key, and the third cache key.

14. The method of claim 10 further comprising serving the first content in response to the first request from the first server, and serving the second content in response to the second request from the second server.

15. The method of claim 10, wherein the first request comprises the common URL, the first cache key, and the third cache key, the method further comprising (i) detecting the first cache key as a relevant cache key modifying content requested with the common URL, and the third cache key as an irrelevant cache key not modifying content requested with the common URL and (ii) excluding the third cache key from said selecting of the first server based on said detecting.

16. A method comprising:

receiving a plurality of requests for distribution across a set of servers, wherein the plurality of requests comprise a common Uniform Resource Locator (URL) and different cache keys, wherein the different cache keys direct the common URL of the plurality of requests to a plurality of content, and wherein each server of the set of servers is tasked with delivering different content of the plurality of content;

extracting said common URL, a first cache key, and a different second cache key from a first request of the plurality of requests;

extracting said common URL, the second cache key, and a different third cache key from a second request of the plurality of requests;

determining that the first request and the second request are directed to same particular content of the plurality of content based on inclusion of the second cache key in a tracked list of relevant cache keys and exclusion of the first cache key and the third cache key from the tracked list of relevant cache keys;

selecting a particular server from the set of servers tasked with serving the particular content by accounting for the common URL and the second cache key in the first request and the second request, and by not accounting for the first cache key in the first request or the third cache key in the second request as a result of said determining; and distributing the first request and the second request to the particular server based on said selecting.

17. The method of 16, wherein the first request and the second request comprise HyperText Transfer Protocol (HTTP) GET requests transmitted over a digital network.

18. The method of claim 16, wherein accounting for the common URL and the second cache key comprises producing a result from hashing the second cache key and basing selection of the particular server on said result.

19. The method of claim 16 further comprising extracting said common URL and at least one of the first cache key or the third cache key from a third request of the plurality of requests.

20. The method of claim 19 further comprising distributing the third request to a different second server from the set of servers as a result of the third request excluding the second cache key.

* * * * *